UNITED STATES PATENT OFFICE.

REUBEN G. FARNHAM, OF ELBRIDGE, ASSIGNOR OF ONE-HALF TO CHARLES M. WARNER, OF JORDAN, NEW YORK.

COMPOSITION FOR PLASTERING.

SPECIFICATION forming part of Letters Patent No. 446,382, dated February 10, 1891.

Application filed November 25, 1889. Serial No. 331,527. (No specimens.)

*To all whom it may concern:*

Be it known that I, REUBEN G. FARNHAM, a citizen of the United States, residing at Elbridge, in the county of Onondaga and State of New York, have invented a new and useful composition of matter to be used for the same purposes as plaster, mortar, and cement, namely, for ceilings, walls, pavements, &c., of which composition of matter the following is a specification.

The object of my invention is to produce for the desired purposes a composition that is cheaper, more easily worked, and placed in operative position, capable of a smoother finish, and is more durable and effective than said aforesaid substances. To this end my invention consists, essentially, of a composition composed of the following ingredients, namely: marl, eighty-three and one-third per cent., in bulk, and Portland cement sixteen and two-thirds per cent.

Marl, the base or principal ingredient of my composition, may be used either in its raw condition when taken from its natural position in the earth, in which state it is usually somewhat moist; or, if desired, the moisture may be driven off by a suitable heating process and the dry marl then ground up by suitable machinery, thus forming the same into a dry powder. Mixed with this marl, either in its natural or dried state, as described, is Portland cement, preferably compounded, as stated, in the proportion of five parts of marl to one part of Portland cement when both materials are of a good quality. It is, however, the case that these ingredients—namely, marl and Portland cement—may be compounded in other proportions—as, for instance, as strong as four parts of marl to one of Portland cement, or as weak as eight parts of marl to one per cent. of Portland cement—according to the purpose for which the composition is desired or the purity of the said ingredients.

For the ordinary purposes, as for plastering, the proportions given—namely, five to one—are deemed to be the best, and I frequently mix with my compound a small quantity of jute—as, for instance, five additional parts to every one hundred parts—in order that the said vegetable fiber will give greater tenacity to the composition and render the same somewhat more applicable for plastering. Again, I frequently mix with my composition a small quantity of either white or gray gypsum, which may be in the same proportion thereto as the jute, and thus causes the composition to harden somewhat more quickly and also to be of greater whiteness. When desired for use in cold weather, I also prefer to mix a small quantity of salt—as, for instance, five additional parts to every one hundred parts of my composition—which additional ingredient prevents the freezing of the composition and also aids the hardening. In practice the marl and Portland cement are mixed together in a dry state and are then shipped to the exact locality where they are to be used. They are then mixed up with a sufficient amount of water to render the same pliable and easy to work, whereupon they are applied as ordinary plaster, mortar, cement, and other like articles.

This composition is very readily placed in position, is capable of a high finish, hardens quickly, sticks both to a plain surface and a surface formed with interstices, as lathing, and when hardened does not crack or shiver.

Upon reference to the foregoing description it will be noted that no matter in what proportion the marl and cement are compounded the marl is in considerable excess of the cement, and this particular proportion—that is, an excess of marl compounded with a less amount of cement, and preferably in the proportions of five parts of marl to one of cement—is the essential feature of my invention.

I am aware that an excess of Portland or other suitable cement has been used with a less amount of marl and an equal amount of sand for a facing for sidewalks and other purposes, as set forth in the Patent No. 124,050 to Joshua R. Hayes; but I do not herein claim such a composition.

What I claim, and desire to secure by Letters Patent of the United States, is—

The herein-described composition for plastering, the same being composed of jute, Portland cement, and marl, combined with the Portland cement in excess of the jute and the marl in excess of the Portland cement, in substantially the proportions herein specified.

In testimony whereof I have hereunto signed my name, in the presence of two attesting witnesses, at Syracuse, in the county of Onondaga, in the State of New York, this 14th day of November, 1889.

REUBEN G. FARNHAM.

Witnesses:
CLARK H. NORTON,
A. E. PARSON.